(12) United States Patent
Du et al.

(10) Patent No.: US 9,647,413 B2
(45) Date of Patent: May 9, 2017

(54) HIGH-EFFICIENCY PARALLEL-BEAM LASER OPTICAL FIBRE DRAWING METHOD AND OPTICAL FIBRE

(71) Applicant: FIBERHOME TELECOMMUNICATION TECHNOLOGIES CO., LTD., Wuhan, Hubei (CN)

(72) Inventors: Cheng Du, Wuhan (CN); Wei Chen, Wuhan (CN); Shiyu Li, Wuhan (CN); Yili Ke, Wuhan (CN); Qi Mo, Wuhan (CN); Tao Zhang, Wuhan (CN); Wenyong Luo, Wuhan (CN); Kun Du, Wuhan (CN); Rong Dan, Wuhan (CN)

(73) Assignee: Fiberhome Telecommunication Technologies Co., Ltd., Wuhan, Hubei (CN)

( * ) Notice: Subject to any disclaimer, the term of this patent is extended or adjusted under 35 U.S.C. 154(b) by 0 days.

(21) Appl. No.: 14/909,441

(22) PCT Filed: Aug. 21, 2014

(86) PCT No.: PCT/CN2014/084879
§ 371 (c)(1),
(2) Date: Feb. 1, 2016

(87) PCT Pub. No.: WO2015/027851
PCT Pub. Date: Mar. 5, 2015

(65) Prior Publication Data
US 2016/0181758 A1    Jun. 23, 2016

(30) Foreign Application Priority Data
Aug. 29, 2013  (CN) .......................... 2013 1 0384515

(51) Int. Cl.
*H01S 3/094*  (2006.01)
*C03B 37/012* (2006.01)
(Continued)

(52) U.S. Cl.
CPC .. *H01S 3/094019* (2013.01); *C03B 37/01205* (2013.01); *C03B 37/01228* (2013.01);
(Continued)

(58) Field of Classification Search
CPC ........... H01S 3/094019; H01S 3/06729; H01S 3/094053; H01S 3/06737; C03B 37/01205
See application file for complete search history.

(56) References Cited

U.S. PATENT DOCUMENTS

| 2005/0168804 A1* | 8/2005 | Dawson | ............. H01S 3/06704 359/341.1 |
| 2013/0089113 A1* | 4/2013 | Dong | ................. G02B 6/02357 372/6 |

FOREIGN PATENT DOCUMENTS

| CN | 1776474 A | 5/2006 |
| CN | 102436036 A | 5/2012 |

(Continued)

*Primary Examiner* — Dung Nguyen
(74) *Attorney, Agent, or Firm* — Muncy, Geissler, Olds & Lowe, P.C.

(57) ABSTRACT

Provided are a high-efficiency parallel-beam laser optical fiber drawing method and optical fiber, the method including the steps of: S1: providing base planes on the side surfaces of both a gain optical fiber preform and a pump optical fiber preform, inwardly processing the base plane of the gain optical fiber preform to make a plurality of ribs protrude, and inwardly providing a plurality of grooves on the base plane of the pump optical fiber preform; S2: embedding the ribs into the grooves, tapering and fixing one end of the combination of the ribs and the grooves to form a parallel-beam laser optical fiber preform; S3: drawing the parallel-beam laser optical fiber preform into parallel-beam laser optical (Continued)

fibers. The process has high repeatability, and the obtained parallel-beam laser achieves peelability of pump optical fibers in a set area, thus facilitating multi-point pump light injection of parallel-beam laser optical fibers.

10 Claims, 4 Drawing Sheets

(51) Int. Cl.
    *C03B 37/027*     (2006.01)
    *H01S 3/067*     (2006.01)
    *C03B 37/025*     (2006.01)

(52) U.S. Cl.
    CPC ........ *C03B 37/027* (2013.01); *C03B 37/0253* (2013.01); *H01S 3/06729* (2013.01); *H01S 3/06737* (2013.01); *H01S 3/094053* (2013.01); *C03B 2201/34* (2013.01); *C03B 2203/02* (2013.01); *C03B 2203/10* (2013.01); *C03B 2203/32* (2013.01); *C03B 2203/40* (2013.01); *C03B 2205/40* (2013.01)

(56) References Cited

FOREIGN PATENT DOCUMENTS

| | | | |
|---|---|---|---|
| CN | 103466934 | A | 12/2013 |
| EP | 08 01 827 | B1 | 10/1998 |

\* cited by examiner

HIGH-EFFICIENCY PARALLEL-BEAM LASER OPTICAL FIBRE DRAWING METHOD AND OPTICAL FIBRE

CROSS REFERENCE TO RELATED APPLICATIONS

This application claims priority from China Patent Application No. 201310384515.1, filed on Aug. 29, 2013, in State Intellectual Property Office, the contents of which are hereby incorporated by reference in their entirety for all purposes.

BACKGROUND OF THE INVENTION

1. Field of the Invention

The present invention relates to the technical field of fibre laser transmission and amplification, and specifically a high-efficiency parallel-beam laser optical fibre drawing method and an optical fibre.

2. Description of the Related Art

A fibre laser is essentially designed to convert low quality pump laser into higher quality laser output. As the application fields are constantly extending, the output power of the fibre laser needs to be risen unceasingly. Currently, a high power fibre laser and a fibre amplifier mainly use double-cladding doped optical fibres. Compared with the divergence angle of multimode pump beam emitted by a semiconductor pump laser, the double-cladding doped optical fibres have a rather small diameter of cladding. Therefore, how to efficiently couple pump light to the inner cladding of the double-cladding optical fibres is a core technology to obtain high power optical fibre laser output.

Figure 1:
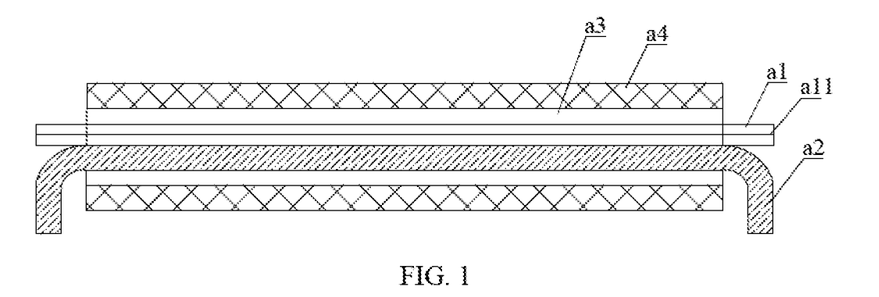
FIG. 1 is a structure diagram of a parallel-beam optical fibre in the background art.
Figure 2:
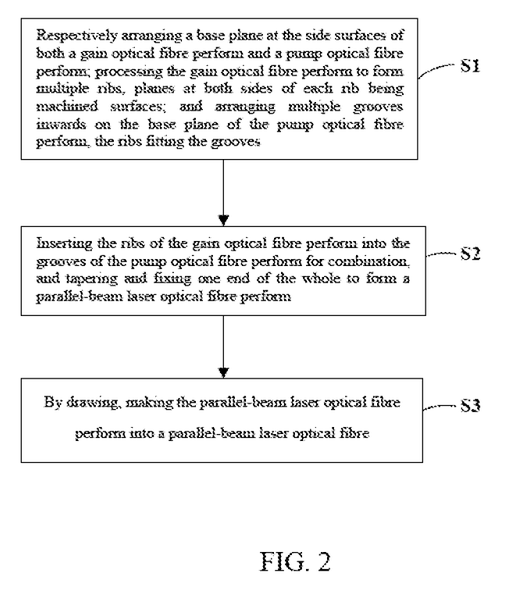
FIG. 2 is a flow diagram of a high-efficiency parallel-beam laser optical fibre drawing method according to the present invention.

At present, pump coupling technology can be roughly divided into end pump coupling technology and side pump coupling technology. Regarding end pump coupling technology, a pump light is coupled to the inner cladding of a double-cladding optical fibre from one or two end faces of the double-cladding optical fibre. As for side pump coupling technology, a pump light is coupled to the inner cladding of a double-cladding optical fibre from the side of the double-cladding optical fibre. As the two ends of the optical fibre are not occupied, the pump light is distributed more uniformly in the optical fibre, thereby facilitating signal light input and output, fibre splicing and signal measurement etc. Typical side pump coupling technology includes V-groove method, embedded reflector method, angular polishing method, diffraction grating pump coupling and GTWave technology etc. In GTWave technology, by using the unique structure of a parallel-beam laser optical fibre drawn from combined active and passive optical fibre performs, a pump light is coupled to a gain optical fibre cable along an axial module of the optical fibre; when the outer diameter or numerical aperture of the optical fibre is comparatively low, a multimode pump light in the passive optical fibre can be efficiently coupled to the active optical fibre; and when the optical fibre is not damaged or deformed, multipoint segmented pumping along the length of the optical fibre can be achieved through pump light injection by discontinuously peeling the passive optical fibre, thereby preventing a problem that heat load is excessively high as a result of centralized incident power, and obtaining stable high power laser output from the gain optical fibre. As shown in FIG. 1, a structure diagram of a parallel-beam optical fibre, a gain optical fibre a1 containing a quartz component and at least one pump optical fibre a2 are arranged in parallel and are physically fused at a contact part; a low refractive index coating a3 covers the outer layer of the gain optical fibre a1 and the pump optical fibre a2; and a protective coating a4 covers the outermost layer. A fibre core all of the gain optical fibre a1 is doped with a rare earth element; when a pump light penetrates through the fibre core all, laser level "population inversion" will be triggered through the rare earth element, and a cladding of the gain optical fibre will form a resonant cavity to generate laser oscillation output. When injected from one end of the pump optical fibre a2 peeled from the parallel-beam laser optical fibre, the pump light will be coupled to the gain optical fibre a1 from the joint of the pump optical fibre a2 and the gain optical fibre a1, thereby greatly improving pump coupling efficiency, and preventing a problem of local heat management resulted from point contact in conventional side pumping.

A current making process of optical fibres similar to the parallel-beam optical fibre structure mainly uses a low speed parallel-beam drawing method, through which a gain optical fibre perform and at least one pump optical fibre perform are fixed on a optical fibre drawing tower in a certain arrangement pattern, and are concurrently stretched under certain speeds and tensions till two adjacent optical fibres are in contact, so that light can penetrate through adjacent optical fibres. Although the current single optical fibre drawing process is mature, concurrent drawing of multiple optical fibres needs to overcome some difficulties. For example, when multiple optical fibre performs are combined and drawn, as the drawing tension and temperature of each perform as well as the coating pressure against corresponding optical fibres are varied, effective control and adjustment are hard to be achieved. Besides, in the current perform combination drawing method, as multiple columnar performs are combined before drawing, and optical fibre performs are melted under low speed and high tension to ensure that optical fibres can be effectively fused, the quartz parts of the optical fibres drawn are melted and tightly combined and cannot be peeled as required, thus multipoint pump light injection along the length direction cannot be achieved. When the parallel-beam laser optical fibre is put into actual use, multiple points need to be selected along the length direction of the optical fibre to peel the pump optical fibre so as to achieve multipoint pumping along the length direction of the gain optical fibre as well as tight contact (or fusion) of the pump optical fibre and the gain optical fibre; and the key to achieve the application performance of the parallel-beam laser optical fibre is to achieve the peelability of the pump optical fibre.

SUMMARY OF THE INVENTION

The present invention aims to provide a high-efficiency parallel-beam laser optical fibre drawing method and an optical fibre to overcome drawbacks of the prior art; the preparation process obviously lowers the combination difficulty of performs and improves the repeatability of process; the obtained parallel-beam laser optical fibre has a stable structure and can achieve the peelability of a pump optical fibre in a set area, thereby facilitating multipoint pump light injection along the length direction of the parallel-beam laser optical fibre.

To achieve the above-mentioned purpose, the present invention provides a high-efficiency parallel-beam laser fibre drawing method, including the steps of: S1. respectively arranging a base plane at the side surfaces of both a gain optical fibre perform and a pump optical fibre perform; processing the base plane of the gain optical fibre perform inwards to make multiple ribs protrude, planes at both sides of each rib being machined surfaces; and arranging multiple grooves inwards on the base plane of the pump optical fibre perform, the ribs fitting the grooves; S2. inserting the ribs of the gain optical fibre perform into the grooves of the pump optical fibre perform; and after the two are combined, tapering and fixing one end of the whole to form a parallel-beam laser-optical fibre perform; and S3. by drawing, making the parallel-beam laser-optical fibre perform into a parallel-beam laser-optical fibre.

Based on above-mentioned technical scheme, the ribs are rectangular prisms; and the centre of the cross section of the ribs and the axis of the gain optical fibre perform are located on a same plane.

Based on above-mentioned technical scheme, the grooves are rectangular grooves; and the centre of the cross section of the grooves and the axis of the pump optical fibre perform are located on a same plane.

Based on above-mentioned technical scheme, the gain optical fibre perform and the pump optical fibre perform constitute a tight fit; and a dimensional deviation between the fit bodies is lower than 0.25 mm.

Based on above-mentioned technical scheme, a fibre core of the gain optical fibre perform is located outside the ribs; and the distance from the fibre core to the base plane is greater than the distance from the machined surfaces to the base plane.

Based on above-mentioned technical scheme, the central axis of the fibre core and the central axis of the pump optical fibre are located on a same plane; and the centre of the cross section of the ribs, the centre of the cross section of the grooves and the centre of the cross section of the fibre core are all located on a same straight line.

Based on above-mentioned technical scheme, the gain optical fibre perform is 30 to 720 mm in length; the ribs are 10 to 300 mm in length along the axial direction of the optical fibre; and the distance between the centres of two adjacent ribs is 12 to 420 mm.

Based on above-mentioned technical scheme, the height of the ribs above the machined surfaces is the same as the depth of the grooves, that is, 0.5 to 35.0 mm; the ribs have a same width as the grooves, that is, 1.0 to 70.0 mm; the machined surfaces at the two sides of each rib have a same width; the base planes at the two sides of each groove have a same width; and the width of the machined surfaces and the base planes is 1.0 to 35.0 mm.

Based on above-mentioned technical scheme, in S3, the parallel-beam laser optical fibre perform is put in a temperature self-adaptive drawing device to draw by melting in high temperature from 1800 to 2200☐; the drawing speed is controlled within 5 to 200 m/min; and according to the combination of gain and pump optical fibres measured on line, drawing tension is adjusted from 20 to 150 g to make a parallel-beam laser optical fibre.

The present invention further provides a high-efficiency parallel-beam laser optical fibre, including a gain optical fibre, a pump optical fibre, a low refractive index coating and a protective coating, where the gain optical fibre includes a fibre core; a bonding surface of the gain optical fibre and the pump optical fibre includes a melting bonding part and a close contact part; the melting bonding part and the close contact part are arranged in a separating manner; the close contact part and the axis of the parallel-beam laser optical fibre are located on a same plane; and a plane where the melting bonding part is located is at one side of a plane where the close contact part is located.

The present invention has the following beneficial effects:
1. processing of ribs on a base plane of a gain optical fibre perform and processing of grooves on a base plane of the pump optical fibre perform can be carried out by a numerically-controlled machine tool, instead of any high precision mechanical finishing device; the outer surface of the formed rib structure and the inner surface of the grooves have low smoothing difficulty; and thanks to high smoothness, high processing efficiency, low cost and short time, the present invention is suitable for large-scale production;

2. a machined surface of the gain optical fibre and the base plane of the pump optical fibre are fit in the length direction, and form separate close contact parts; as a peelable structure is provided, the pump optical fibre and the gain optical fibre can be separated when an outer coating is peeled off, thereby meeting the application requirement of multipoint injection;

3. the ribs of the gain optical fibre perform are fit with the grooves of the pump optical fibre, so that the performs can be combined simply and more firmly than those arranged in parallel in a common combination manner, thereby ensuring that locations of the performs are relatively fixed during drawing;

4. in the drawing process, the fit part of the combined performs can be fully fused due to the tension of glass molten state, thereby preventing a likely technical risk of conventional methods that a pump light cannot be coupled to the gain optical fibre as a coating is squeezed into the contact surface of the pump optical fibre and the gain optical fibre; and 5. the parallel-beam laser optical fibre of the present invention has good optical performance and reliability and fine pump light coupling performance, and can achieve optical fibre axial multipoint pumping and efficient pump light coupling, with a 5 m optical fibre coupling efficiency above 80%.

MARKS OF DRAWINGS OF THE BACKGROUND ART

Gained optical fibre a1, fibre core a11, pump optical fibre a2, low refractive index coating a3, and protective coating a4

MARKS OF DRAWINGS OF EMBODIMENTS

Gained optical fibre perform 1, rib 11, fibre core 12, base plane 13, pump optical fibre perform 2, groove 21, machined surface 3;

Gained optical fibre b1, pump optical fibre b2, low refractive index coating b3, protective coating b4, melting bonding part b5, and close contact part b6.

DESCRIPTION OF THE PREFERRED EMBODIMENTS

The present invention is further elaborated below according to drawings.

Figure 3:
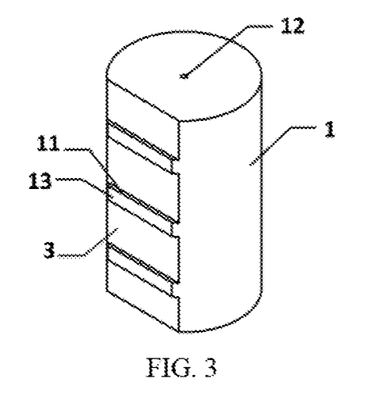
FIG. 3 is a stereo view of a gain optical fibre perform according to an embodiment of the present invention.
Figure 4:
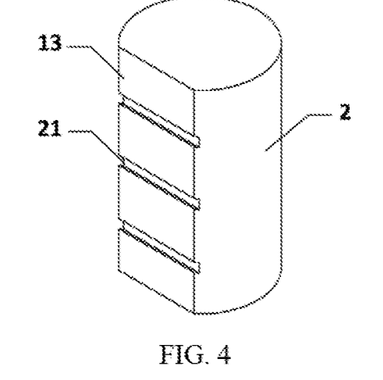
FIG. 4 is a stereo view of a pump optical fibre perform according to an embodiment of the present invention.
Figure 5:
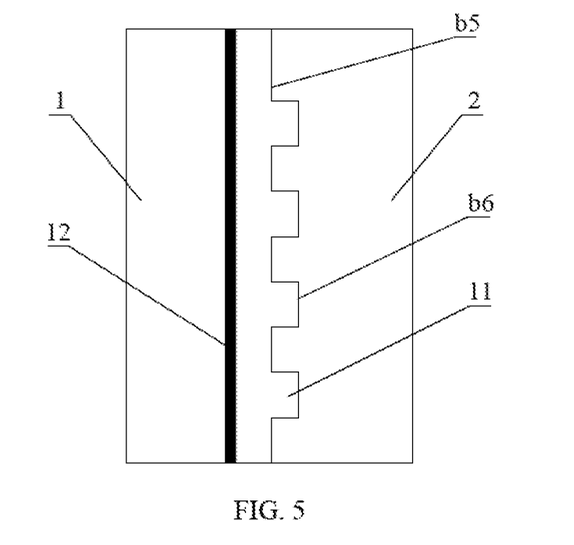
FIG. 5 is a structure diagram of a parallel-beam laser optical fibre perform according to an embodiment of the present invention.
Figure 6:
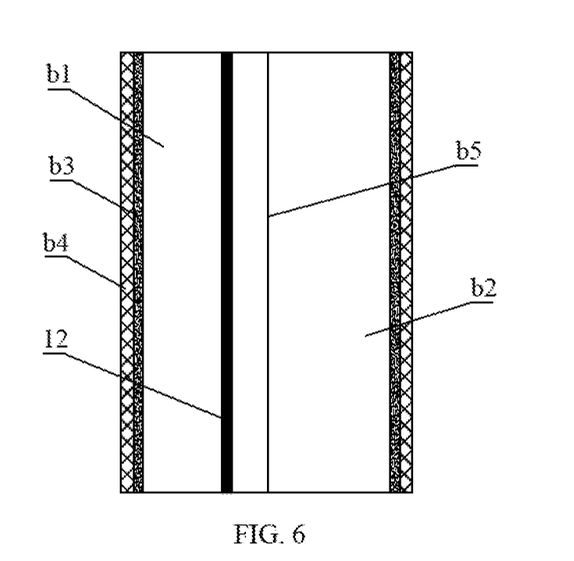
FIG. 6 is a schematic diagram of a cross section of a close contact part of a parallel-beam laser optical fibre perform according to an embodiment of the present invention.

As shown in FIG. 2 to FIG. 5, a high-efficiency parallel-beam laser optical fibre drawing method of the present invention includes the following steps of:

S1. respectively arranging a rectangular base plane 13 at the side of a gain optical fibre perform 1 and a pump optical fibre perform 2; processing the base plane 13 inwards into multiple identical rectangular grooves with a same interval to highlight multiple ribs 11, where planes (namely bottom surfaces of the rectangular grooves) at both sides of each rib 11 are machined surfaces 3; the gain optical fibre perform 1 is 30 to 720 mm in length; the ribs 11 are 10 to 300 mm in length along the axial direction of the optical fibre; the distance between the centres of two adjacent ribs is 12 to 420 mm; the ribs 11 are prisms; the centre of the cross section of the ribs and the axis of the gain optical fibre perform 1 are located on a same plane; multiple points of the base plane 13 of the pump optical fibre perform 2 are processed into grooves with a same interval, thereby forming grooves 21 matching the ribs 11; the grooves 21 are rectangular grooves; the centre of the cross section of the grooves and the axis of the pump optical fibre perform 2 are located on a same plane;

the gain optical fibre perform 1 has a fibre core 12 outside the ribs 11; the distance from the fibre core 12 to the base plane 13 is greater than the distance from the machined surfaces 3 to the base plane 13; the fibre core 12 and the central axis of the pump optical fibre perform 2 are located on a same plane; the central axis of the fibre core and the central axis of the pump optical fibre perform 2 are located on a same plane; the centre of the cross section of the ribs, the centre of the cross section of the grooves and the centre (not shown in the drawing) of the cross section of the fibre core 12 are all located on a same straight line; the height of the ribs 11 above the machined surfaces 3 is the same as the depth of the grooves 21, that is, 0.5 to 35.0 mm; the ribs 11 have a same width as the grooves 21, that is, 1.0 to 70.0 mm; the machined surfaces 3 at the two sides of each rib 11 have a same width; the base planes 13 at the two sides of each groove 21 have a same width; the width of the machined surfaces 3 and the base planes 13 is 1.0 to 35.0 mm; and processing of the gain optical fibre perform 1 and the pump optical fibre perform 2 can be carried out concurrently or in an arbitrary sequence;

S2. combining the gain optical fibre perform 1 and the pump optical fibre perform 2; inserting the ribs 11 of the gain optical fibre perform 1 into the grooves 21 of the pump optical fibre perform 2; and tapering and fixing one end of the combined whole to form a parallel-beam laser-optical fibre perform, where the gain optical fibre perform 1 and the pump optical fibre perform 2 constitute a tight fit; and a dimensional deviation between the fit bodies is lower than 0.25 mm; and S3. putting the parallel-beam laser optical fibre perform in a temperature self-adaptive drawing device to draw by melting in high temperature from 1800 to 2200□; controlling the drawing speed within 5 to 200 m/min; and according to the combination of gain and pump optical fibres measured on line, adjusting drawing tension from 20 to 150 g to make a parallel-beam laser optical fibre as required, where in the parallel-beam laser optical fibre, the base planes 13 of the ribs 11 of the original gain optical fibre perform 1 are melted with the inner bottom surfaces of the grooves 21 of the pump optical fibre perform 2, while the machined surfaces 3 of the original gain optical fibre perform 1 are not melted, but tightly fit with the base planes 13 of the pump optical fibre perform 2; and the 5 m transmission optical fibre coupling efficiency of the parallel-beam laser optical fibre is greater than 80%, while the side-pumped effective absorption coefficient is greater than 3 dB/m, and the load capacity is greater than 500 W.

Figure 7:
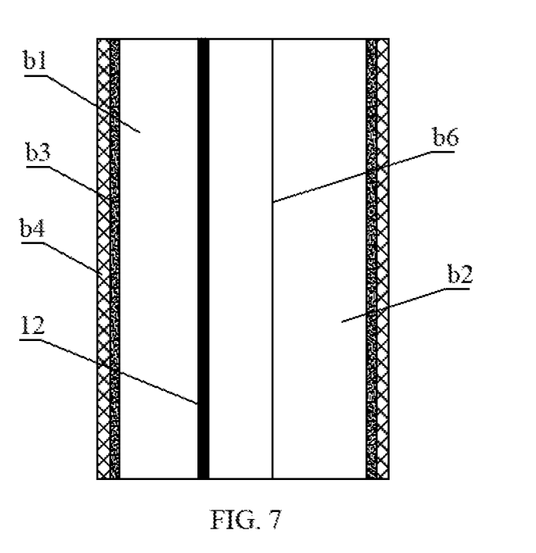
FIG. 7 is a schematic diagram of a cross section of a melting bonding part of a parallel-beam laser optical fibre perform according to an embodiment of the present invention.

As shown in FIG. 5 and FIG. 7, a high-efficiency parallel-beam laser optical fibre of the present invention includes a gain optical fibre b1, a pump optical fibre b2, a low refractive index coating b3 and a protective coating b4, where the gain optical fibre b1 includes a fibre core 12; a bonding surface of the gain optical fibre b1 and the pump optical fibre b2 includes a melting bonding part b5 and a close contact part b6; the melting bonding part b5 and the close contact part b6 are arranged in a separating manner; the reason is that after the high-efficiency parallel-beam laser optical fibre perform is drawn, the base planes 13 of the original ribs 11 are melted with the inner surfaces of the grooves 21, thereby forming multiple melting bonding parts b5, while the machined surfaces 3 of the original gain optical fibre perform 1 are tightly fit with the base planes 13 of the pump optical fibre perform 2, thereby forming multiple close contact parts b6; the close contact parts b6 and the axis of the high-efficiency parallel-beam laser optical fibre are located on a same plane, that is, the close contact parts b6 are multiple small planes that are arranged with a same interval; the axis of the high-efficiency parallel-beam laser optical fibre penetrates through the centres of the small planes; all the melting bonding parts b5 are located on a plane, which is at one side of a plane where the multiple close contact parts b6 are located; therefore, the high-efficiency parallel-beam laser optical fibre forms different light structures with periodic intervals inside; the close contact parts b6 form a peelable parallel-beam laser optical fibre structure that can be optically coupled and is likely to be peeled; with a large contact area, the melting bonding parts b5 can be efficiently coupled and are hard to be peeled after melting due to the combined action of temperature and tension in the process of drawing by high temperature melting; therefore, the high-efficiency parallel-beam laser optical fibre can meet different requirements of parallel-beam laser optical fibres for the structure features of optical fibres for efficient coupling and multipoint pumping application, and can set distribution of tight coupling structures according to the injection points required by the absorption feature of the gain optical fibre b1.

The present invention is further elaborated below through embodiments.

Embodiment 1

As shown in FIG. 3 to FIG. 7, a gain optical fibre perform 1 doped with rare earth in a core zone is processed inwards from a base plane 13 to form 25 ribs 11; the ribs 11 are 1.5 mm in height (namely a distance from a machined surface 3 to the base plane 13); the length of the ribs 11 along the axial direction of the optical fibre is 10 mm; the centres of two adjacent ribs 11 have a distance of 12 mm; a pump optical fibre perform 2 with a quartz component is processed inwards from a base plane 13 to form multiple rectangular grooves 21 at positions corresponding to the ribs 11 of the gain optical fibre perform 1; the processing depth of the grooves 21 is 1.5 mm;

the processed gain optical fibre perform 1 with a rare earth doping diameter of 1.7 mm in the core layer and a cladding of 17.3 mm is combined with the grooved pump optical fibre perform 2 with a cladding of 17.3 mm, that is, the ribs 11 of the gain optical fibre perform 1 are inserted into the grooves 21 of the pump optical fibre perform 2; the error of fit is 0.15 mm; the centre lines of the ribs 11 and the grooves 21 and the axes of the gain optical fibre perform 1 and the pump optical fibre perform 2 are located in a same plane; one end of the combined whole perform is melted and drawn into a parallel-beam laser optical fibre perform as shown in FIG. 5; and finally, the parallel-beam laser optical fibre perform is placed on a drawing tower to draw at approximately 1950□; the drawing tension and speed are controlled, so that the two optical fibres form two structure patterns, namely tight melting and peelable contact according to processing design, and are made into a parallel-beam laser optical fibre with a gain optical fibre diameter of 201 um, a pump optical fibre diameter of 199 um and a coating diameter of 562 um; and major test indexes of the optical fibre are provided in Table 1.

TABLE 1

Performance indexes of parallel-beam laser optical fibre

| Optical performance indexes | |
|---|---|
| Operating wavelength | 1030-1115 nm |
| Numerical aperture of inner cladding NAclad | 0.46 |
| 5 m coupling efficiency | 82% |
| Cladding absorption (at 975 nm) | 3.2 dB/m |
| Geometric dimensioning indexes | |
| Fibre core diameter of gain optical fibre | 20.5 um |
| Quartz cladding diameter of gain optical fibre | 201 um |
| Quartz cladding diameter of pump optical fibre | 199 um |
| Coating diameter | 562 um |

Embodiment 2

As shown in FIG. 3 to FIG. 7, a gain optical fibre perform 1 doped with rare earth in a core zone is processed inwards from a base plane 13 to form 4 ribs 11; the ribs 11 are 4 mm in height (namely a distance from a machined surface 3 to the base plane 13); the length of the ribs 11 along the axial direction of the optical fibre is 50 mm; the centres of two adjacent ribs 11 have a distance of 120 mm; a pump optical fibre perform 2 with a quartz component is processed inwards from a base plane 13 to form multiple rectangular grooves 21 at positions corresponding to the ribs 11 of the gain optical fibre perform 1; the processing depth of the grooves 21 is 4 mm;

the processed gain optical fibre perform 1 with a rare earth doping diameter of 3.6 mm in the core layer and a cladding of 36 mm is combined with the grooved pump optical fibre perform 2 with a cladding of 36 mm, that is, the ribs 11 of the gain optical fibre perform 1 are inserted into the grooves 21 of the pump optical fibre perform 2; the error of fit is 0.15 mm; the centre lines of the ribs 11 and the grooves 21 and the axes of the gain optical fibre perform 1 and the pump optical fibre perform 2 are located in a same plane; one end of the combined whole perform is melted and drawn into a parallel-beam laser optical fibre perform as shown in FIG. 5;

finally, the parallel-beam laser optical fibre perform is placed on a drawing tower to draw at approximately 2000□; the drawing tension and speed are controlled, so that the two optical fibres form two structure patterns, namely tight melting and peelable contact according to processing design, and are made into a parallel-beam laser optical fibre with a gain optical fibre diameter of 201 um, a pump optical fibre diameter of 200 um and a coating diameter of 564 um; and major test indexes of the optical fibre are provided in Table 2.

TABLE 2

Performance indexes of parallel-beam laser optical fibre

| Optical performance indexes | |
|---|---|
| Operating wavelength | 1030-1115 nm |
| Numerical aperture of inner cladding NAclad | 0.46 |
| 5 m coupling efficiency | 87% |
| Cladding absorption (at 975 nm) | 3.4 dB/m |
| Geometric dimensioning indexes | |
| Fibre core diameter of gain optical fibre | 20.3 um |
| Quartz cladding diameter of gain optical fibre | 201 um |
| Quartz cladding diameter of pump optical fibre | 200 um |
| Coating diameter | 565 um |

Embodiment 2

As shown in FIG. 3 to FIG. 7, a gain optical fibre perform 1 doped with rare earth in a core zone is processed inwards from a base plane 13 to form 3 ribs 11; the ribs 11 are 35 mm in height (namely a distance from a machined surface 3 to the base plane 13); the length of the ribs 11 along the axial direction of the optical fibre is 300 mm; the centres of two adjacent ribs 11 have a distance of 420 mm; a pump optical fibre perform 2 with a quartz component is processed inwards from a base plane 13 to form multiple rectangular grooves 21 at positions corresponding to the ribs 11 of the gain optical fibre perform 1; the processing depth of the grooves 21 is 35 mm;

the processed gain optical fibre perform 1 with a rare earth doping diameter of 18 mm in the core layer and a cladding of 180 mm is combined with the grooved pump optical fibre perform 2 with a cladding of 180 mm, that is, the ribs 11 of the gain optical fibre perform 1 are inserted into the grooves 21 of the pump optical fibre perform 2; the error of fit is 0.25 mm; the centre lines of the ribs 11 and the grooves 21 and the axes of the gain optical fibre perform 1 and the pump optical fibre perform 2 are located in a same plane; one end of the combined whole perform is melted and drawn into a parallel-beam laser optical fibre perform as shown in FIG. 5;

finally, the parallel-beam laser optical fibre perform is placed on a drawing tower to draw at approximately 2100□; the drawing tension and speed are controlled, so that the two optical fibres form two structure patterns, namely tight melting and peelable contact according to processing design, and are made into a parallel-beam laser optical fibre with a gain optical fibre diameter of 201 um, a pump optical fibre diameter of 201 um and a coating diameter of 564 um; and major test indexes of the optical fibre are provided in Table 3.

TABLE 3

Performance indexes of parallel-beam laser optical fibre

| Optical performance indexes | |
|---|---|
| Operating wavelength | 1030-1115 nm |
| Numerical aperture of inner cladding NAclad | 0.46 |
| 5 m coupling efficiency | 81% |
| Cladding absorption (at 975 nm) | 3.0 dB/m |
| Geometric dimensioning indexes | |
| Fibre core diameter of gain optical fibre | 20.1 um |
| Quartz cladding diameter of gain optical fibre | 202 um |
| Quartz cladding diameter of pump optical fibre | 201 um |
| Coating diameter | 564 um |

The present invention is not limited to the above-mentioned embodiments. A person of ordinary skill in the field may make certain improvements or polishing without departing from the principle of the present invention and the improvements or polishing shall fall within the protection scope of the present invention. Those not described in the specification in detail shall be prior art known to persons professionally skilled in the field.

What is claimed is:

1. A high-efficiency parallel-beam laser optical fibre drawing method, characterized by comprising the steps of:
    S1. respectively arranging a base plane at the side surfaces of both a gain optical fibre preform and a pump optical fibre preform; processing the base plane of the gain optical fibre preform inwards to make multiple ribs protrude, planes at both sides of each rib being machined surfaces; and arranging multiple grooves inwards on the base plane of the pump optical fibre preform, the ribs fitting the grooves;
    S2. inserting the ribs of the gain optical fibre preform into the grooves of the pump optical fibre preform; and after the two are combined, tapering and fixing one end of the combined whole of the gain optical fibre preform and the pump optical fibre preform to form a parallel-beam laser optical fibre preform; and
    S3. by drawing, making the parallel-beam laser optical fibre preform into a parallel-beam laser optical fibre.

2. The high-efficiency parallel-beam laser optical fibre drawing method according to claim 1, characterized in that the ribs are rectangular prisms; and the centre of the cross section of the ribs and the axis of the gain optical fibre preform are located on a same plane.

3. The high-efficiency parallel-beam laser optical fibre drawing method according to claim 1, characterized in that the grooves are rectangular grooves; and the centre of the cross section of the grooves and the axis of the pump optical fibre preform are located on a same plane.

4. The high-efficiency parallel-beam laser optical fibre drawing method according to claim 1, characterized in that the gain optical fibre preform and the pump optical fibre preform constitute a tight fit; and a dimensional deviation between the fit bodies is lower than 0.25 mm.

5. The high-efficiency parallel-beam laser optical fibre drawing method according to claim 1, characterized in that a fibre core of the gain optical fibre preform is located outside the ribs; and the distance from the fibre core to the base plane is greater than the distance from the machined surfaces to the base plane.

6. The high-efficiency parallel-beam laser optical fibre drawing method according to claim 5, characterized in that the central axis of the fibre core and the central axis of the pump optical fibre are located on a same plane; and the centre of the cross section of the ribs, the centre of the cross section of the grooves and the centre of the cross section of the fibre core are all located on a same straight line.

7. The high-efficiency parallel-beam laser optical fibre drawing method according to claim 1, characterized in that the gain optical fibre preform is 30 to 720 mm in length; the ribs are 10 to 300 mm in length along the axial direction of the optical fibre; and the distance between the centres of two adjacent ribs is 12 to 420 mm.

8. The high-efficiency parallel-beam laser optical fibre drawing method according to claim 1, characterized in that the height of the ribs above the machined surfaces is the same as the depth of the grooves, that is, 0.5 to 35.0 mm; the ribs have a same width as the grooves, that is, 1.0 to 70.0 mm; the machined surfaces at the two sides of each rib have a same width; the base planes at the two sides of each groove have a same width; and the width of the machined surfaces and the base planes is 1.0 to 35.0 mm.

9. The high-efficiency parallel-beam laser optical fibre drawing method according to claim 1, characterized in that in S3, the parallel-beam laser optical fibre preform is put in a temperature self-adaptive drawing device to draw by melting in high temperature from 1800 to 2200° C.; the drawing speed is controlled within 5 to 200 m/min; and according to the combination of gain and pump optical fibres measured on line, drawing tension is adjusted from 20 to 150 g to make a parallel-beam laser optical fibre.

10. A high-efficiency parallel-beam laser optical fibre based on the method according to claim 1, comprising a gain optical fibre, a pump optical fibre, a low refractive index coating and a protective coating, where the gain optical fibre comprises a fibre core, characterized in that a bonding surface of the gain optical fibre and the pump optical fibre comprises a melting bonding part and a close contact part; the melting bonding part and the close contact part are arranged in a separating manner; the close contact part and the axis of the parallel-beam laser optical fibre are located on a same plane; and a plane where the melting bonding part is located is at one side of a plane where the close contact part is located.

* * * * *